(12) United States Patent  
Ito (10) Patent No.: US 7,054,669 B2
(45) Date of Patent: May 30, 2006

(54) FOLDABLE CELLULAR PHONE WITH A SEPARATE DISPLAY ON EACH HALF

(75) Inventor: Koichi Ito, Tokyo (JP)

(73) Assignee: Sony Corporation (JP)

( * ) Notice: Subject to any disclaimer, the term of this patent is extended or adjusted under 35 U.S.C. 154(b) by 504 days.

(21) Appl. No.: 10/339,798

(22) Filed: Jan. 10, 2003

(65) Prior Publication Data

US 2003/0144036 A1    Jul. 31, 2003

(30) Foreign Application Priority Data

Jan. 15, 2002    (JP) ............................ P2002-006768

(51) Int. Cl.
*H04B 1/38*    (2006.01)
(52) U.S. Cl. .................... 455/566; 455/567; 455/575.1
(58) Field of Classification Search ................ 455/566, 455/567, 575.3, 550.1, 557; 340/915, 995.27
See application file for complete search history.

(56) References Cited

U.S. PATENT DOCUMENTS

| | | | |
|---|---|---|---|
| 6,792,293 | B1* | 9/2004 | Awan et al. ................. 455/566 |
| 2001/0016508 | A1* | 8/2001 | Kido et al. ................. 455/575 |
| 2002/0039914 | A1* | 4/2002 | Hama et al. ................. 455/566 |

* cited by examiner

*Primary Examiner*—Tilahun Gesesse
(74) *Attorney, Agent, or Firm*—Lerner, David, Littenberg, Krumholz & Mentlik, LLP

(57) ABSTRACT

A folding type mobile phone comprises a first housing having a main display on a top surface of the first housing, and a second housing having a keyboard on a top surface of the second housing. The mobile phone also has a second display that is always exposed to be seen by a user even when the first and the second housings are closed. When the first and the second housings are closed, a display direction of the information displayed on the second display is changed to a direction reverse to the direction where the information is displayed in the second display when the first and the second housings are opened.

4 Claims, 6 Drawing Sheets

FOLDABLE CELLULAR PHONE WITH A SEPARATE DISPLAY ON EACH HALF

CROSS REFERENCE TO RELATED APPLICATIONS

This application claims priority from Japanese Priority Document No. P2002-006768, filed on Jan. 15, 2002 with the Japanese Patent Office, which document is hereby incorporated by reference.

BACKGROUND OF THE INVENTION

1. Field of the Invention

This invention relates to a mobile information terminal apparatus and a display control method for such mobile information terminal apparatus, and particularly relates to a display control apparatus and/or method for a folding type mobile phone having plural display sections.

2. Related Art

Recently, a large-sized display section (this is called as a main-display section, herein after) for displaying a menu display image or a picture display image has been provided to a mobile phone, and further a small-sized display section (this is called as a sub-display section herein after) for displaying sub or secondary information display image has also been provided, in addition. In such mobile phone that has the above mentioned configuration, it is possible to improve an usability of thus configured mobile phone by selectively displaying the information display image onto the main-display section and the sub-display section depending on how to use them.

Figure 1:
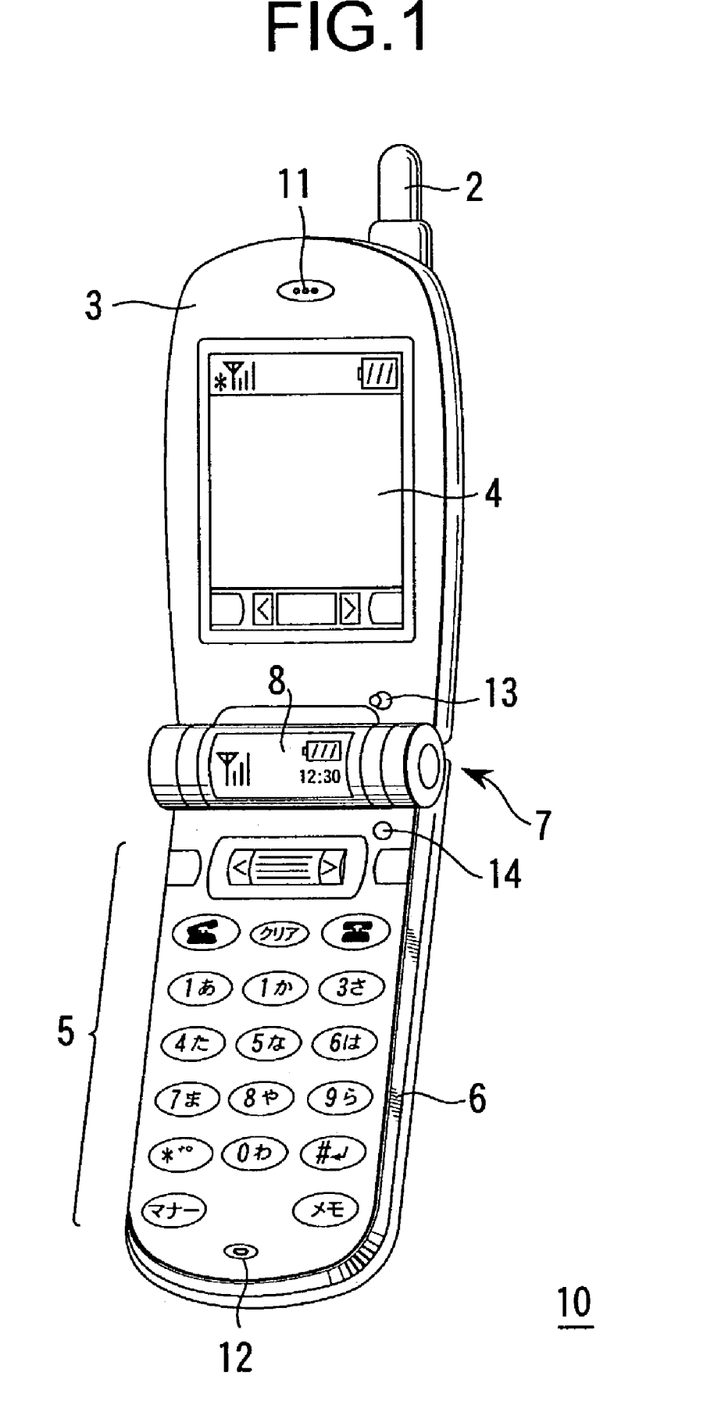
FIG. 1 is a schematic diagram showing an external view of a folding type mobile phone according to the present invention.

Among those mobile phones having such sub-display section, there is a folding type (called as a clamshell-type, sometimes) mobile phone 1 as depicted in FIG. 1, wherein the mobile phone 1 has a main-display section 4 provided on a top surface of an upper housing 3 which carries an antenna 2 thereon, and a sub-display section 8 provided on a lower housing 6 and at a hinge section 7 which enables the upper housing 3 and the lower housing 6 to open/close so as to cover respective top surface to each other.

Figure 6A:
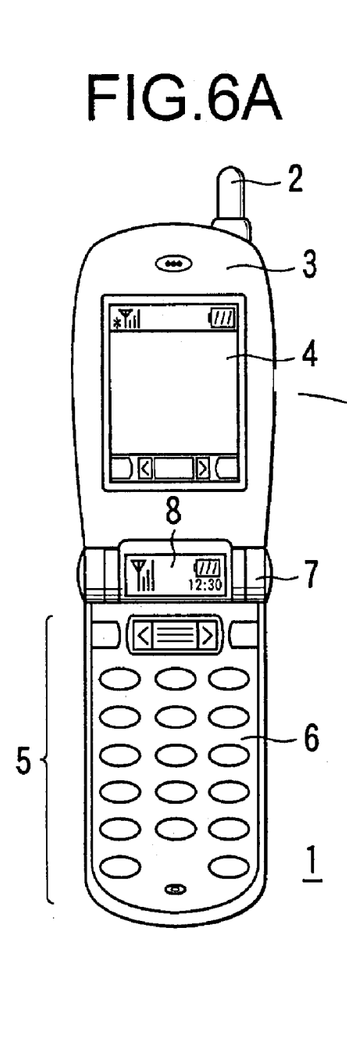
FIGS. 6A to 6C are schematic diagrams showing a conventional folding type mobile phone.
Figure 6B:
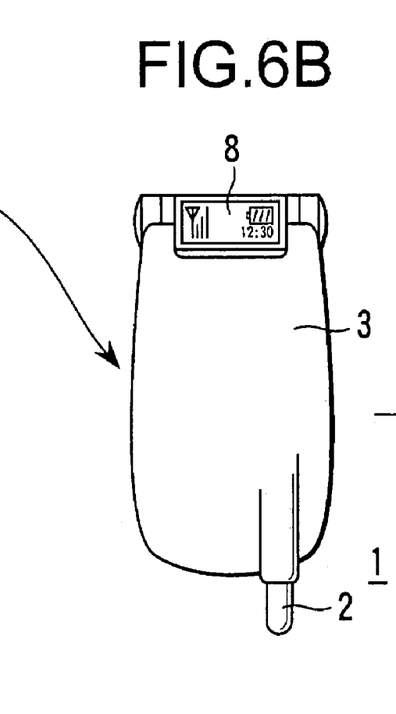

In the mobile phone 1 thus configured as above, the sub-display section 8 is so configured as to be exposed to outside even in a closed condition of the housings 3, 6 as depicted in FIG. 6B, and accordingly, when the housings 3, 6 are opened as shown FIG. 6A in order to have a call, both the main-display section 4 and the sub-display section 8 are simultaneously exposed to a user, and further, when the housings 3, 6 are closed in order to be carried, the main-display section 4 is covered but, the sub-display section 8 is always exposed to the user, and accordingly, it is able to have the user recognize the information regardless of opening/closing of the housings 3, 6.

Figure 6C:
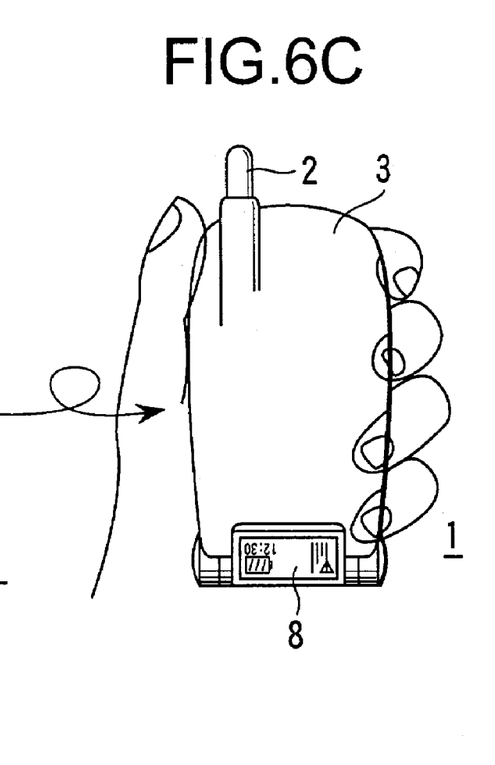

In this case, in the mobile phone 1 of this configuration, the antenna 2 is projected from the upper side housing 3, so that when the housings 3, 6 are closed, it is very common for a user to hold the mobile phone 1 as the antenna 2 is positioned upper side as shown in FIG. 6C when the housings 3, 6 are closed. In this holding condition, the lower side housing 6 is made upside-down when the housings 3, 6 are opened. Accordingly, the sub-display section 8 located on the lower side housing 6 is also made upside down, and there is a problem that the visibility of the sub-display section 8 becomes worse in the holding condition because of the reverse (upside down) display to the user.

SUMMARY OF THE INVENTION

The present invention is proposed by considering the above mentioned problems, and proposes a mobile information terminal capable of securing always a better information visibility, a display control method, a display control program for carrying out such display control method, and a program storage medium for such display control program.

In order to solve the above mentioned problems, according to the present invention, a first housing and a second housing are provided to configure a folding type mobile information terminal, and these two housings are linked to each other to be freely opened or closed, and there are provided a first information display section on a top surface of the first housing, and a second information display on the second housing or a section for linking. In this case, the first information display section is covered by closing the first and second housings, while the second information display section is always exposed to outside regardless of the opening/closing of the first and second housings. In this case, when the first and second housings are closed, a display direction of the second information display section is changed upside down, for example, to secure a better visibility of the second information display section.

DETAILED DESCRIPTION ORTHE PREFERRED EMBODIMENTS

Herein after, one embodiment of the present invention will be explained in detail with reference to the accompanying drawings.

1. A Whole Configuration of a Mobile Phone

A whole configuration of the folding type (sometimes called as a clamshell type) mobile phone is depicted in FIG. 1, wherein the same reference numerals are assigned to the same common parts in FIGS. 6A, 6B, and 6C. Namely, in FIG. 1, a reference numeral 10 shows a folding type mobile phone as a mobile information terminal apparatus to which the present invention is applied, and this folding type mobile phone 1 has a hinge section 7 at a central portion, an upper housing 3 as a first housing, and a lower housing 6 as a second housing, thereby the upper housing 3 and the lower housing are so formed as to be able to fold or close at the hinge section 7.

An antenna 2 for transmission/reception a radio wave is attached to an upper right side and a back side of the upper housing 3 so as to be able to be pulled-out/pushed-in, and the radio wave is transmitted/received to/from a base station (not depicted here).

Further a main-display section 4 as a first information display means comprised of an LCD (Liquid Crystal Display) is provided at a top surface of the upper housing 3, and a variety of information such as a menu corresponding to respective function, a receiving condition of the radio wave, a residual battery power amount, a transmission log, a reception log, an e-mail message, a telephone address, a schedule, a picture image and the like are to be displayed thereon.

In addition, a speaker 11 is provided at an upper side of the main-display section 4 and at the top surface of the upper housing 3, and is so configured as to reproduce a voice of an opponent user at a transmitting side and an incoming call ring.

On the contrary, a microphone 12 for picking up voice of a user upon communication is provided at a lower top surface of the lower housing 6.

Further an operating section 5 comprised of various operation keys such as numeric keys 0 through 9, a call key, a redial key, an off key, a clear key, an e-mail key, and the like is provided.

As described above, the upper housing 3 and the lower housing 6 are linked to be able to freely be opened/closed, and in the closed (folded condition) condition, the main-display section 4 and the operating section 5 provided on the top surfaces of respective housing 3, 6 are protected by covering with respective housing 3, 6, and further a total size of the mobile phone 10 is minimized so as to be easily carried by the user.

In addition, a battery pack (not shown) is installed in the back of the lower side housing 6, and when the power is made ON by operating the operating section 5, the mobile phone 10 is activated to be in operating condition by supplying the power from the battery pack to internal circuit blocks.

Further in the mobile phone 10, a cylindrical shaped projecting section 13 is provided at a neighbor of the hinge section 7, and at the top surface of the upper side housing 3, and also a opening/closing detecting section 14 is provided at a position corresponding to the projecting section on the top surface of the lower side housing 6, thereby the opening/closing condition of the housings 3, 6 are able to be detected via the opening/closing detecting section 14 by depressing the opening/closing detecting section 14 with the projecting section 13 when the housings 3, 6 are closed.

Figure 2:
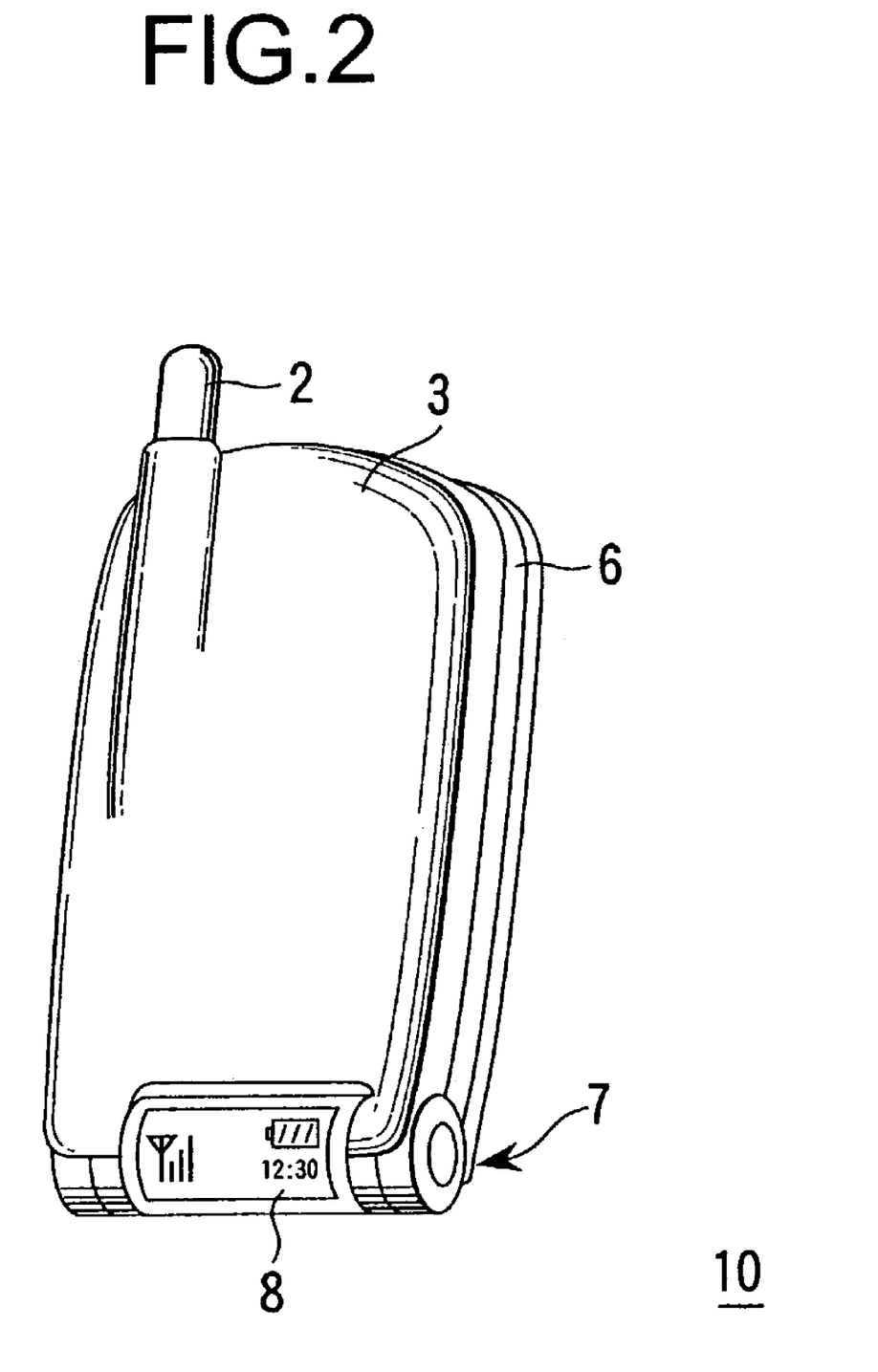
FIG. 2 is a schematic diagram of the folding type mobile phone where a pair of housings is folded.

In addition to this, in the mobile phone 10, a small sized sub-display section 8 as compared to the main-display section 4 is provided at the top surface of the lower side housing 6 and at the hinge section 7. The sub-display section 8 as a second information display means is configured to be always exposed to outside even when the housings 3, 6 are closed as shown in FIG. 2, and thereby when the housings 3, 6 are opened for calling as shown in FIG. 1, both the main-display section 4 and the sub-display section 8 are to be seen by the user, and even when the housings 3, 6 are closed for carrying, the sub-display section 8 is still to be seen while the main-display section 4 is covered, thereby it becomes possible for the user to recognize the information regardless of the opening/closing condition of the housings 3, 6.

Figure 3A:
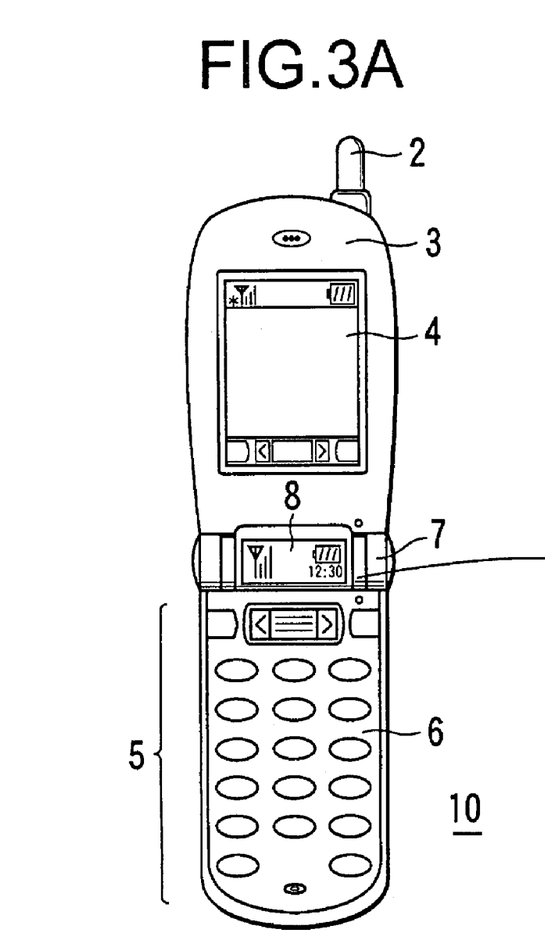
FIGS. 3A and 3B are schematic diagrams showing a display condition of a sub-display section.
Figure 3B:
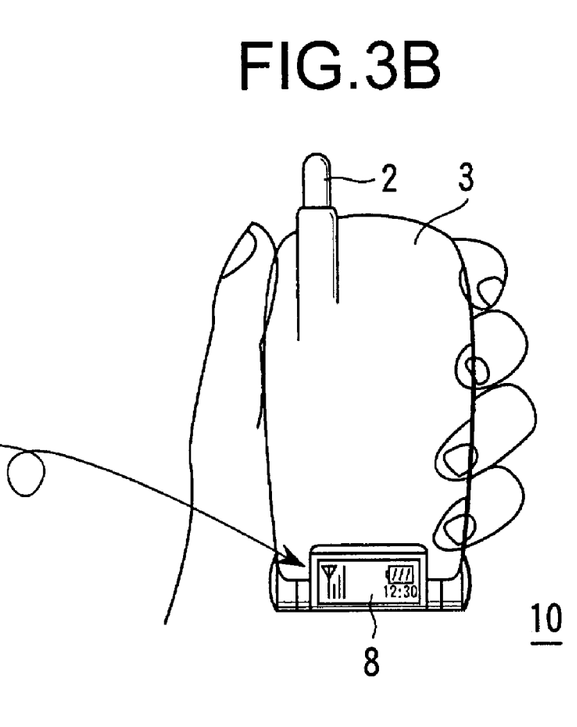

Further this mobile phone 10, in accordance with a display control processing as described later, displays in reverse (upside down) a display image at the sub-display section 8 as shown in FIG. 3B when the housings 3, 6 are closed, so that the visibility of the sub-display section 8 is retained.

2. Circuit Configuration of the Mobile Phone

Figure 4:
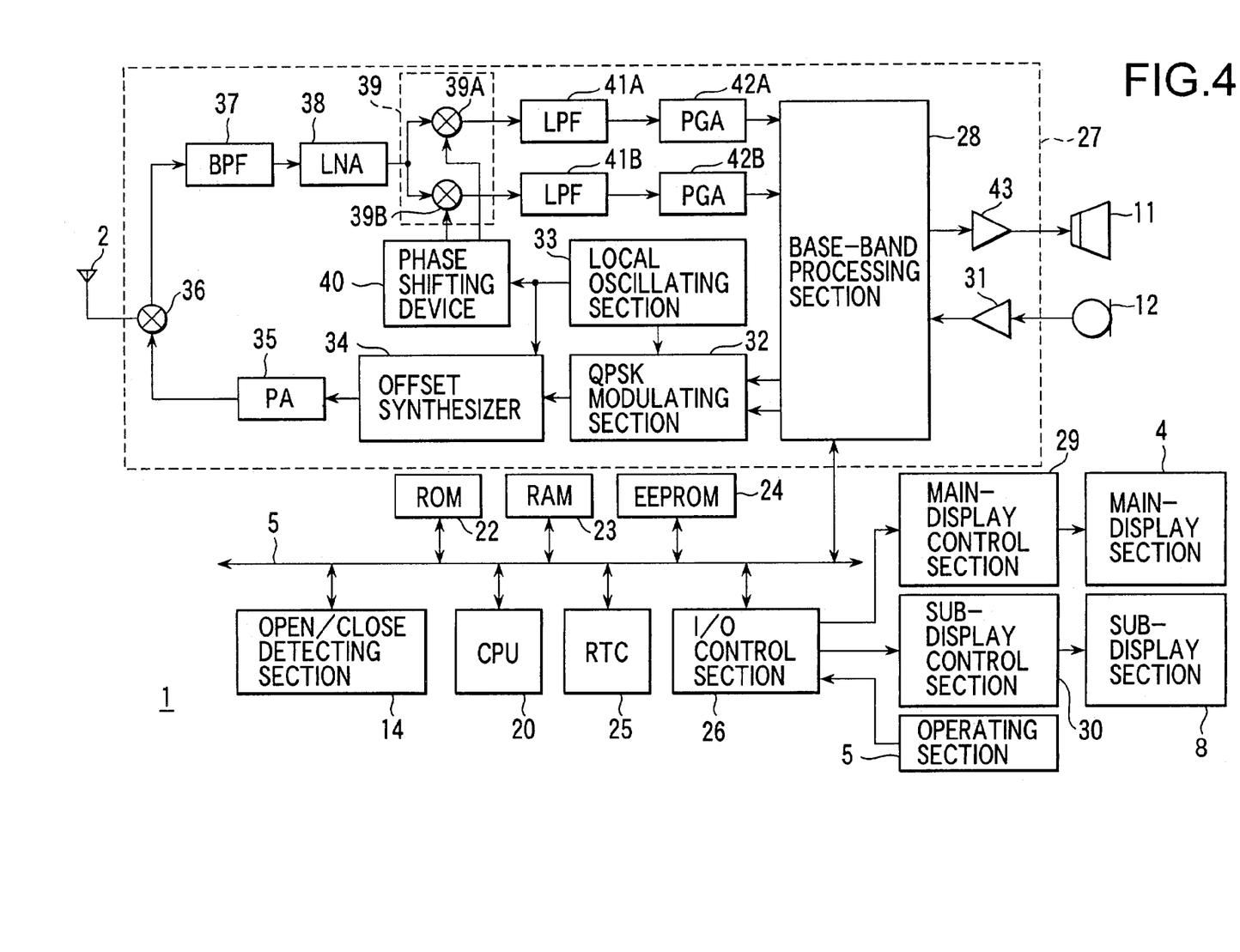
FIG. 4 is a block diagram showing a circuit diagram of the folding type mobile phone.

A circuit configuration of the mobile phone 10 is explained next with reference to a block diagram as shown in FIG. 4. In the mobile phone 10, a CPU 20 which totally controls various functions of the mobile phone 10 is connected to a ROM (Read Only Memory) 22 storing various programs to be executed by the CPU 20, a RAM (Random Access Memory) 23 used as a work area for the CPU 20, an EEPROM (Electrically Erasable & Programmable ROM) 24 for storing various data such as a telephone book, data used in case of setting the mobile phone 10, an RTC (Real Time Clock) 25 for supplying current date and time data, an I/O (Input/Output) control section 26 for controlling input and output of the mobile phone 10, and a base-band processing section 28 of the transmitting/receiving section 27 via a bus 21.

In addition, the CPU 20 is connected via the bus 21 with the open/close detecting section 14 for detecting opening/closing condition for the housings 3, 6 of the mobile phone 10.

Further, the I/O control section is connected with the operating section 5, and further is connected with the main-display section 4 and the sub-display section 8 via the main-display control section 29 and the sub-display control section 30, respectively.

Accordingly, the CPU 20 of the mobile phone 10 executes various communication processing such as a calling processing, a call-ending processing, and the like by controlling the transmitting/recessing section 27 depending on the various commands entered via the operating section 5.

In this case, the base-band processing section 28 of the transmitting/recessing section 27 generates a transmitting base-band signal by A/D (analog to digital) converting and compressing the transmitting audio signal collected by the microphone 12 and amplified by the microphone-amplifier 31 under the control of the CPU 20, then supplies thus generated signal to a QPSK (Quadrature Phase Shift Keying) modulating section 32.

The QPSK modulating section 32 generates a transmitting signal comprising I-component and Q-component by QPSK modulating the incoming transmitting base-band signal with an RF local signal supplied from a local oscillator 33, and supplies thus generated signal to an offset synthesizer 34.

The offset synthesizer 34 converts the frequency of the transmitting signal by mixing an RF local signal supplied from the local oscillator 33 with the transmitting signal, and by supplying to the antenna 2 via an antenna sharing device 36 after amplifying by a power amplifier 35, thus supplied transmitting signal is transmitted from the antenna 2 with the predetermined converted transmission frequency.

In addition, the transmitting/receiving section 27 supplies the receiving signal received by the antenna 2 via the antenna sharing device 36 to a band-pass filter 37 for limiting the frequency band, then supplies to a demodulator 39 after amplifying by a LNA (Low Noise Amplifier) 38.

On the contrary, a phase shifter 40 shifts a phase of the RF local signal supplied from the local oscillator 33 by 90 degrees to generate two RF local signals having different phase by 90 degrees to each other, and supplies these to the demodulator 39.

A pair of mixing devices 39A and 39B included in the demodulator 39 mixes respectively corresponding RF local signal with the receiving signal, generates two received base-band signals each having I-component and Q-component, and supplies thus generated signals to the base-band processing section 28 after processing a frequency band limitation, a gain adjustment, and the like via corresponding low pass filters 41A and 41B, and programmable gain amplifiers 42A and 42B.

The base-band processing section 28 generates a received audio signal by expanding and D/A (digital to analog) converting the received base-band signal, and supplies thus generated signal to a speaker amplifier 43 to output to the speaker 11.

Further, the CPU 20 of the mobile phone 10 controls the main-display control section 29 and the sub-display control section 30 via the I/O control section 26 in response to various processing commands entered via the operating section 5, and displays the information depending on the various processing commands on the main-display section 4 and the sub-display section 8.

At this time, the CPU 20 executes the display control processing in accordance with a display control program stored in the ROM 22, and executes a suitable information display corresponding to the opening/closing condition of the housings 3, 6 by controlling a start of display or a stop of display for the information on the main-display section 4, and the reverse (upside down) display of the information on the sub-display 8 depending on the opening/closing condition of the housings 3,6.

3. Display Control Processing

Figure 5:
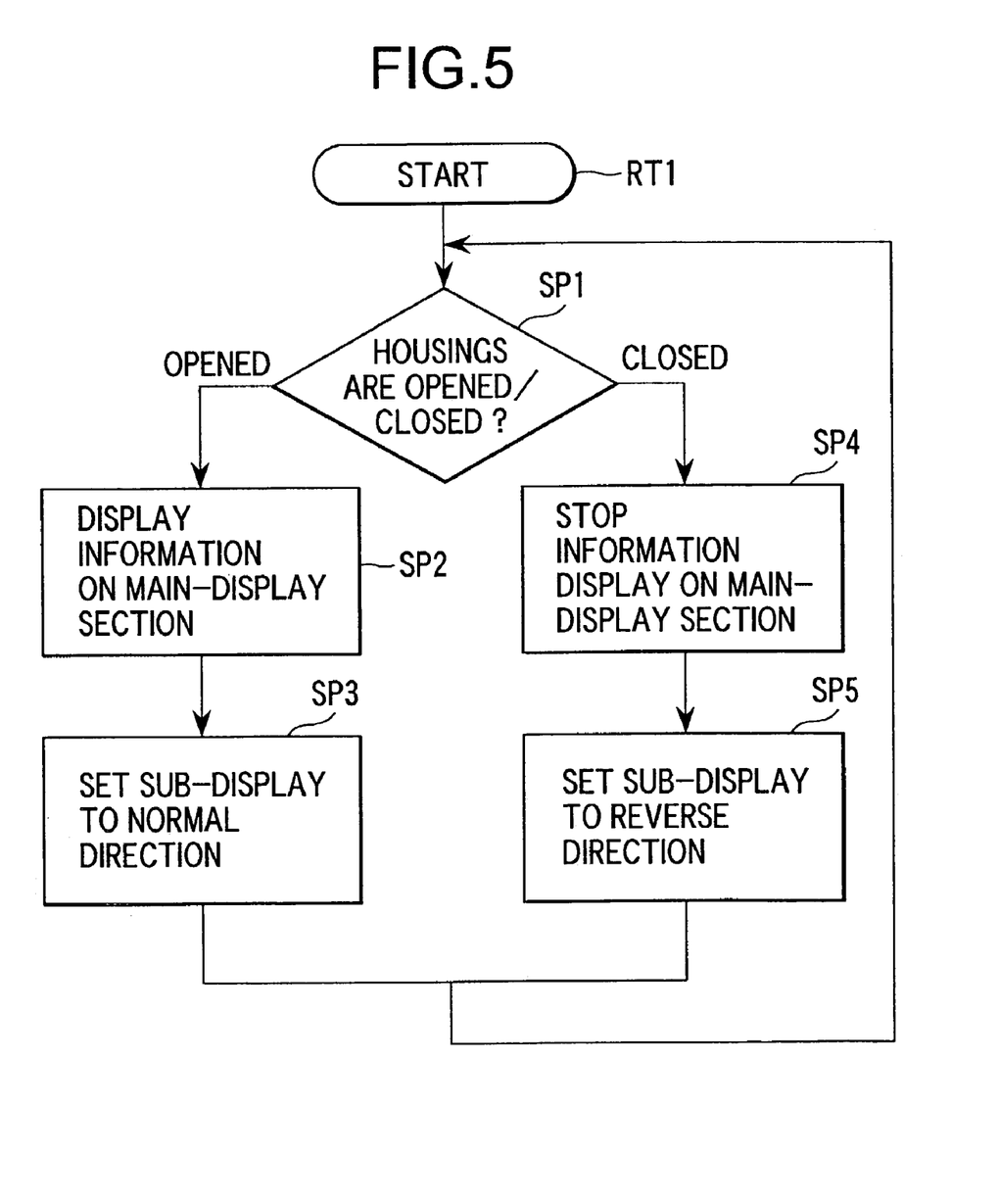
FIG. 5 is a flow chart showing display control processing.

Next, the display control processing of the mobile phone 10 is explained with reference to the flowchart as shown in FIG. 5.

The CPU 20 as the information display control means starts the processing from a stating step of a routine RT1 when the power of the mobile phone 10 is made ON, then proceeds the processing to step SP1.

At step SP1, the CPU 20 detects the opening/closing condition of the housings 3, 6 via the opening/closing detecting section 14. When it is judged that the housings 3, 6 are open at step SP1, the CPU 20 proceeds the processing to step SP2.

At step SP2, the CPU 20 displays the information at the main-display section 4 by controlling the main-display control section 29, then proceeds the processing to next step SP3.

At step SP3, the CPU 20 controls the sub-display control section 29, displays the information on the sub-display section 8 with a normal position display where the hinge section 7 side is upper side as shown in FIG. 3A, then proceeds the processing back to step SP1. The normal position display is displayed in a condition where directions of the main-display section 4 and the sub-display section 8 are the same, so that it is possible to have the user watch the display image on both the main-display section 4 and the sub-display section 8 at the same normal direction.

On the contrary, if it is judged that the housings 3, 6 are opened at step SP1, then the CPU 20 proceeds the processing to step SP4.

At step SP4, the CPU 20 stops the information display of the main-display section 4 by controlling the main-display control section 29, and proceeds the processing to step SP5.

At step SP5, the CPU 20 controls the sub-display control section 30 to display the sub-display section 8 in reverse display mode where the hinge section 7 side is positioned at bottom side as shown in FIG. 3B, and proceeds the processing backward to step SP1. In this reverse display mode, the sub-display section 8 is correctly displayed when being held by the user while the antenna 2 is an upper-side, it is possible to have the user correctly watch the display image on the sub-display section 8 at the normal direction even when the housings 3, 6 are closed.

4. Operation and Advantage

In the configuration as above described, the CPU 20 of the mobile phone 10 detects the opening/closing condition of the housings 3, 6 via the opening/closing detecting section 14. The CPU 20 displays the information at the main-display section 4 and the sub-display section 8 with a normal direction display when the housings 3, 6 are opened.

Further, the CPU 20 stops the information display at the main-display section 4 and displays with a reverse direction display at the sub-display section 8 when the housings 3, 6 are closed, thereby even when the user holds the mobile phone 10 in the condition where the antenna 2 is positioned upside, the CPU 20 displays the sub-display section 8 in correct direction to be seen by the user normally.

5. Another embodiment

In the above mentioned embodiment, it is described in a case where this invention applied to the folding type mobile phone 10 that has the antenna 2 at the top end in the back of the upper side housing 3, and has the sub-display section 8 at the hinge section 7, but the invention is not limited to this, and, this invention may be applied to a mobile phone having various housing design such as a folding type mobile phone having the antenna 2 on the lower side housing 6.

Even in this case, it is possible to always secure the visibility of the sub-display section 8 by changing the display direction thereof (for example, by 90 degree rotation or 180 degree rotation) depending on the opening/closing condition of the housings 3, 6, and further to improve freedom for the housing design.

Further in the above mentioned embodiment, it is described in the case where this invention is applied to the folding type mobile phone 10 having the main-display section 4 and the sub-display section 8, but this invention is not limited to the mobile phone 10, and may be applied to various mobile information terminals, having folding type housings such as a note-pad type personal computer, a PDA (Personal Digital Assistant) or the like, for example.

Further in the above mentioned embodiment, it is described in the case where the CPU 20 of the mobile phone 10 carries out the above mentioned display control processing in accordance with the display control program previously stored in the ROM 22, but this invention is not limited to this, and this invention may be carried out by installing a program storage media storing the above mentioned display control program into the mobile phone 10.

The program storage media to be installed into the mobile phone 10 for enabling the execution of the display control program executing a sequence of processing as described above is not only a package media such as a flexible magnetic disk, a CD-ROM (Compact-Disc Read Only Memory), and a DVD (Digital Versatile Disc), but may be realized by a semiconductor memory or a magnetic hard disk capable of temporally or permanently storing these programs.

Further as means for storing these programs into the program storage media, a wired or wireless communication media such as a LAN (Local Area Network), the internet, a digital broadcast satellite or the like is utilized, and in addition, the these programs may be installed via various communication interface such as a router, a modem or the like.

What is claimed is:

1. A mobile information terminal apparatus comprising:
   a first housing and a second housing hinged as to open and close relative to each other;
   first display means provided on a top surface of said first housing so as to be covered with said second housing when said first housing and second housing are closed;

second display means provided on a top surface of said second housing so as to be exposed for viewing from outside when said first housing and second housing are closed; and information display control means for changing a display direction of information displayed on said second display means when said first housing and second housing are closed, wherein said first display means and said second display means are both visible and provide display in a same direction when said first housing and said second housing are opened, and wherein said information display control means stops a display of information on said first display means when said first housing and second housing are closed.

2. A display control method for a mobile information terminal apparatus having a first housing and a second housing hinged as to be opened and closed relative to each other, comprising the steps of:

providing a first information display means on a top surface of said first housing so as to be covered with said second housing when said first housing and second housing are closed;

providing a second information display means on a top surface of said second housing so as to be exposed for viewing from outside when said first housing and second housing are closed;

changing a display direction of the information displayed on the second information display means when said first housing and second housing are closed relative to each other, wherein said first display means and said second display means are both visible and provide display in same direction when said first housing and said second housing are opened; and stopping the information display on the first information display means when the first housing and the second housing are closed relative to each other.

3. A display control program to be applied to a mobile device having first and second housings linked to freely be opened/closed relative to each other, a first information display provided on a top face of the first housing and covered by said second housing when the first and second housings are closed, and a second information display provided on a linked portion of the first and the second housings and not covered by said second housing when the first and second housings are closed:

said display control program comprising the steps of:

changing a display direction of the information displayed on the second information display means when said first and second housings are closed, wherein said first display means and said second display means are both visible and provide display in a same direction when said first housing and second housing are opened; and stopping the information display of the first display means when said first housing and said second housing are closed.

4. A program storage media for storing a display control program to be applied to a mobile information terminal apparatus having first and second housings linked to freely be opened/closed relative to each other, a first information display provided on a top surface of the first housing and covered by said second housing when the first and the second housings are closed, and a second information display provided on a linked portion of the first and the second housings, and not covered by said second housing when the first and the second housings are closed:

said display control program comprising the steps of:

changing a display direction of the information displayed on the second information display means when said first and the second housings are closed, wherein said first display means and said second display means are both visible and provide display in a same direction when said first housing and second housing are opened; and stopping the information display of the first display means when said first housing and said second housing are closed.

* * * * *

UNITED STATES PATENT AND TRADEMARK OFFICE
CERTIFICATE OF CORRECTION

PATENT NO. : 7,054,669 B2
APPLICATION NO. : 10/339798
DATED : May 30, 2006
INVENTOR(S) : Koichi Ito It is certified that error appears in the above-identified patent and that said Letters Patent is hereby corrected as shown below:

On Title Patent (57) ABSTRACT, line 1, delete "comprises" and insert there for --includes--.
Line 5, after "exposed" insert --so as--.
Line 9, delete "changed to a direction reverse" and insert therefor --reversed in relation--.
Column 4, line 30, "AID" should read --A/D--.
Column 6, line 32, after "terminals" delete ",".

Signed and Sealed this

Fifth Day of December, 2006

JON W. DUDAS
*Director of the United States Patent and Trademark Office*